United States Patent [19]

Yamanashi

[11] Patent Number: 4,789,229
[45] Date of Patent: Dec. 6, 1988

[54] ZOOM LENS SYSTEM
[75] Inventor: Takanori Yamanashi, Tokyo, Japan
[73] Assignee: Olympus Optical Co., Ltd., Tokyo, Japan
[21] Appl. No.: 24,082
[22] Filed: Mar. 10, 1987
[30] Foreign Application Priority Data
    Mar. 11, 1986 [JP] Japan .................. 61-51523
[51] Int. Cl.[4] .......................................... G02B 15/163
[52] U.S. Cl. ..................................... 350/427; 350/423
[58] Field of Search ............................... 350/423, 427
[56] References Cited
    U.S. PATENT DOCUMENTS
    4,299,454 11/1981 Betensky ........................ 350/427
    4,494,828 1/1985 Masumato et al. ............ 350/427
    4,702,567 10/1987 Kato et al. ..................... 350/427
    FOREIGN PATENT DOCUMENTS
    60-14213 1/1984 Japan .

Primary Examiner—John K. Corbin
Assistant Examiner—Scott J. Sugarman
Attorney, Agent, or Firm—Cushman, Darby & Cushman

[57] ABSTRACT

A zoom lens system comprising a first lens group $G_1$ having positive refractive power, a second lens group $G_2$ having negative refractive power, a third lens group $G_3$ having positive refractive power, a fourth lens group $G_4$ having positive refractive power, and a fifth lens group $G_5$ having negative refractive power, in the order from the object side, and arranged to vary the focal length or the lens system as a whole by moving, out of the above-mentioned lens groups, at least the first lens group $G_1$, third lens group $G_3$ and fourth lens group $G_4$ along the optical axis, the zoom lens system being arranged that the vari-focal range thereof includes a position in the range of wide field angle, the vair-focal ratio thereof is high, i.e., 6, favorable performance is maintained over the whole vari-focal range, and the lens system as a whole is made small in size.

9 Claims, 6 Drawing Sheets

ZOOM LENS SYSTEM

BACKGROUND OF THE INVENTION (a) Field of the Invention

The present invention relates to a zoom lens system and, more particularly, to a zoom lens system with a high vari-focal ratio.

(b) Description of the Prior Art

In recent years, for zoom lens systems, there is a large tendency that the vari-focal ratio is being made higher and higher. Generally, known high vari-focal ratio zoom lens systems are arranged that a position of a wide field angle is included in the vari-focal range and, at the same time, the vari-focal ratio is about 6. Even for such high vari-focal ratio zoom lens systems, it is required to make the lens system convenient for operation and for carrying around and, therefore, difficulties occur in the design of the lens system.

The zoom lens system disclosed in Japanese published unexamined patent application No. 14213/85 is known as a zoom lens system which is arranged to attain the object to make the vari-focal ratio high and to make the lens system compact by overcoming the above-mentioned difficulties. Said known zoom lens system comprises four lens groups respectively having positive refractive power, negative refractive power, positive refractive power, and positive refractive power in the order from the object side and is arranged that a plural number of len groups are used as movable lens groups at the time of zooming. To make the lens system compact, said known zoom lens system is arranged that the second lens group, out of said movable lens groups, is moved toward the object side in a position near the wide position so as to thereby make the diameter of the front lens small and, moreover, refractive powers of respective lens groups are made strong. Besides, a glass material with anomalous dispersion is used in the first lens group in order to thereby prevent aggravation of chromatic aberration and variation of monochromatic aberrations to be caused when the lens system is arranged as described in the above.

However, as the vari-focal range of said known zoom lens system is wide, i.e., as the vari-focal ratio is about 6, large variation of aberrations occurs at the time of zooming, residual chromatic aberration is large, and it is impossible to obtain uniform and favorable performance over the whole vari-focal range.

SUMMARY OF THE INVENTION

It is, therefore, a primary object of the present invention to provide a zoom lens system which is arranged to be small in size and to have a high vari-focal ratio and arranged to have uniform and favorable performance over the whole vari-focal range by adopting an adequate zooming system optimum distribution of refractive power, and optimum lens configuration and by selecting adequate glass materials so as to thereby correct chromatic aberration.

Figure 1:
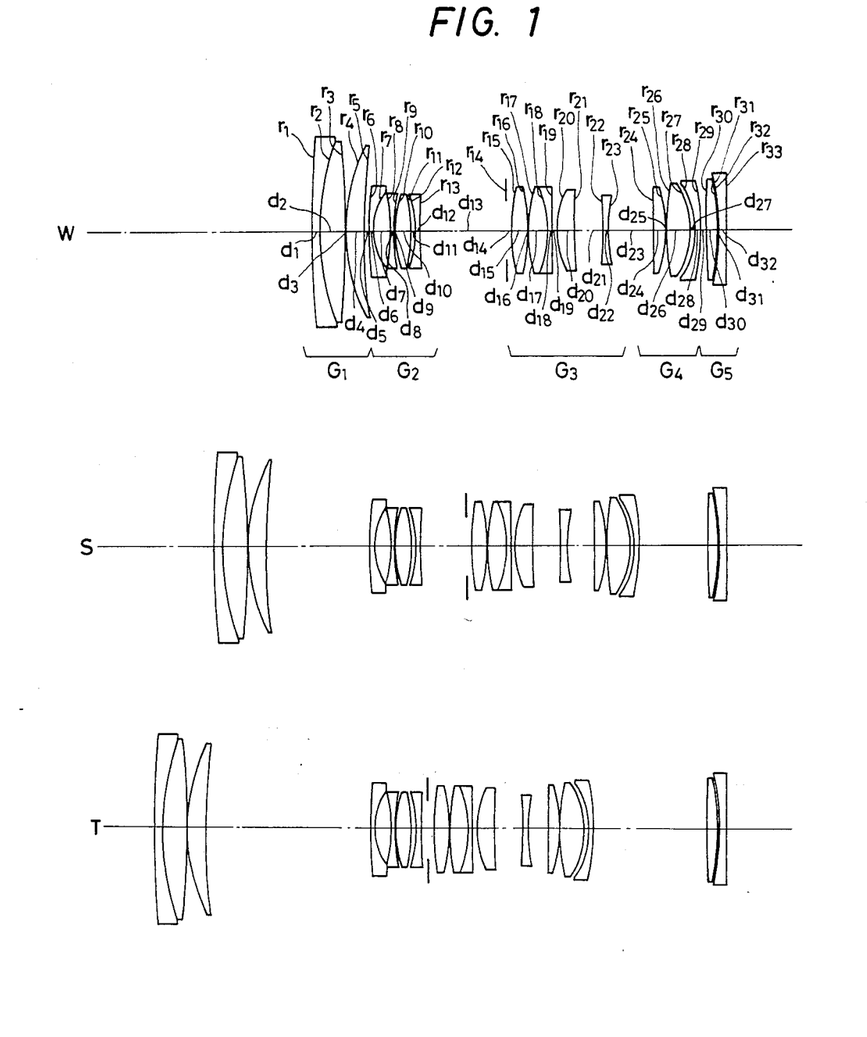
FIG. 1 shows a sectional view illustrating the lens configuration of preferred embodiments of the zoom lens system according to the present invention.

The zoom lens system according to the present invention has a lens configuration as shown in FIG. 1. That is, the zoom lens system according to the present invention comprises a first lens group $G_1$ having positive refractive power, a second lens group $G_2$ having negative refractive power, a third lens group $G_3$ having positive refractive power, a fourth lens group $G_4$ having positive refractive power, and a fifth lens group $G_5$ having negative refractive power in the order from the object side and is arranged to vary the focal length of the lens system as a whole by moving, out of said lens groups, at least the first lens group $G_1$, third lens group $G_3$ and fourth lens group $G_4$ along the optical axis. Besides, the zoom lens system according to the present invention is arranged to fulfill the following conditions:

$$0.15 < |f_2/f_1| < 0.3 \tag{1}$$

$$0.5 < |\beta_{3w} \cdot \beta_{4w}| < 2.5 \tag{2}$$

$$1.01 < \beta_5 < 1.3 \tag{3}$$

where, reference symbols $f_1$ and $f_2$ respectively represent focal lengths of the first lens group $G_1$ and second lens group $G_2$, reference symbol $\beta_{3w}$ represents the lateral magnification of the third lens group $G_3$ in the wide position, reference symbol $\beta_{4w}$ represents the lateral magnification of the fourth lens group $G_4$ in the wide position, and reference symbol $\beta_5$ represents the lateral magnification of the fifth lens group $G_5$.

The condition (1) defines the refractive power of the first lens group $G_1$ and refractive power of the second lens group $G_2$. If $|f_2/f_1|$ is made larger than the upper limit of the condition (1), the refractive power of the second lens group $G_2$ becomes weaker than the case of the adequate distribution of refractive power, the diameter of the front lens becomes large, and it is impossible to make the lens system small in size. Moreover, the refractive power of the first lens group $G_1$ becomes strong and, in case that the adequate distribution of refractive power is adopted for the third lens group $G_3$ and lens groups located in rear of the third lens group, it becomes inconvenient for correction of aberrations. If $|f_2/f_1|$ is made smaller than the lower limit of the condition (1), the refractive power of the second lens group $G_2$ becomes strong or the refractive power of the first lens group $G_1$ becomes weak. When the refractive power of the second lens group $G_2$ becomes strong, it is difficult to correct coma and distortion. When the refractive power of the first lens group $G_1$ becomes weak, it is convenient for correction of aberrations. However, the amounts of movements of lens groups at the time of zooming become large. As a result, it becomes impossible to make the lens system small in size, and this is contrary to the object of the present invention.

The condition (2) is established in order to define the vari-focal range of the zoom lens system according to the present invention.

The focal length f of the lens system is decided by the formulas (4) and (5) shown below when lateral magnifications of the second lens group $G_2$, third lens group $G_3$, fourth lens group $G_4$ and fifth lens group $G_5$ are respectively represented by reference symbols $\beta_2$, $\beta_3$, $\beta_4$ and $\beta_5$.

$$f = f_1 \cdot \beta \tag{4}$$

$$\beta = \beta_2 \cdot \beta_3 \cdot \beta_4 \cdot \beta_5 \tag{5}$$

The fact that $|\beta_{3w} \cdot \beta_{4w}|$ is made larger than the upper limit of the condition (2) means that a range of low lateral magnifications is used for the lateral magnification of the second lens group $G_2$ and, to obtain high magnifications by the third lens group $G_3$ and fourth lens Group $G_4$, the amounts of movements of the third and fourth lens groups at the time of zooming should be made large. Therefore, the airspace between the third lens group $G_3$ and fourth lens group $G_4$ for zooming should be made large in the wide position. As a result, in the range of wide field angle, positions where principal rays pass through the fourth lens group $G_4$ and fifth lens group $G_5$ come to marginal portions of lenses. Consequently, lens diameters become large and the quality of image in the marginal portion decreases considerably. Besides, from the view point of distribution of refractive power, the refractive power of the first lens group $G_1$ becomes weak, and the amount of movement of the first lens group $G_1$ becomes large at the time of zooming from the wide position to the teleposition. As a result, the overall length of the lens system becomes long in the teleposition. Moreover, the displacement of the position of the best image surface in the meridional plane becomes large, and it becomes difficult to obtain a flat image surface. Furthermore, when $|\beta_{3w}\cdot\beta_{4w}|$ becomes larger than the upper limit of the condition (2), $|f_2/f_1|$ also becomes larger than the upper limit of the condition (1), and this is not desirable.

If $|\beta_{3w}\cdot\beta_{4w}|$ is made smaller than the lower limit of the condition (2), the magnification to be allotted to the second lens group $G_2$ becomes high in the whole varifocal range and, in case that the second lens group $G_2$ is to be kept fixed in respect to the image surface at the time of zooming, the amount of movement of the first lens group $G_1$ at the time of zooming becomes large. Moreover, the curves showing the amounts of movements of the third lens group $G_3$ and fourth lens group $G_4$ at the time of zooming do not become curves of monotone increasing pattern. As a result, there occurs such tendency that the intensity of light in the marginal portion becomes insufficient in the teleposition. As for distribution of refractive power, the refractive power of the first lens group $G_1$ becomes strong, and variation of astigmatism occurs at the time of zooming. Consequently, astigmatism is considerably undercorrected in the wide position and considerably overcorrected in the teleposition. Therefore, it is impossible to obtain uniform and favourable performance over the whole varifocal range.

Besides, when the second lens group $G_2$ is also arranged as a movable lens group so as to increase the number of movable lens groups for zooming, it is convenient for correction of aberrations and, moreover, it is possible to make the overall length of the lens system short in the teleposition. In that case, however, the lateral magnification $\beta_2$ of the second lens group $G_2$ becomes larger than $\beta_2 = -1x$. If the lateral magnification $\beta_2$ of the second lens group $G_2$ becomes larger than $-1x$ when it is arranged that the curve showing the amount of movement of the first lens group $G_1$ becomes a curve of monotone increasing pattern, the curve showing the amount of movement of the second lens group $G_2$ curves toward the opposite direction by changing the curving direction at the position of $\beta_2 = -1x$. Therefore, it becomes difficult to ensure the manufacturing accuracy of the cam. Moreover, it is not desirable also from the view point of convenience in operation.

The condition (3) defines the magnification of the fifth lens group $G_5$. When $\beta_5$ is made larger than the upper limit of the condition (3), it is convenient for making the lens system as a whole small in size. However, there occurs such tendency that refractive powers of almost all lens groups necessarily becomes strong, and it becomes difficult to correct aberrations. To solve the above-mentioned problem, it is necessary to increase the number of lenses constituting the fifth lens group $G_5$. As a result, the overall length of the lens system increases, and this is contrary to the object of the present invention.

When $\beta_5$ is made smaller than the lower limit of the condition (3), it is generally convenient for correction of aberrations. However, the magnification to be allotted to the fifth lens group $G_5$ becomes zero. As a result, the overall length of the lens system becomes long, and it is impossible to attain the object of the present invention.

The zoom lens system according to the present invention has the basic lens composition as described so far. To attain the object of the present invention, it is preferable to arrange that respective lens groups thereof have concrete lens configurations described below.

That is, it is preferable to arrange that the first lens group $G_1$ comprises a cemented doublet, which consists of a negative meniscus lens and a biconvex lens which are cemented together, and a positive meniscus lens which is located on the image side of said cemented doublet because it is then convenient for making the telephoto ratio small.

The second lens group $G_2$ comprises a negative meniscus lens which is convex toward the object side, a biconcave lens, a biconvex lens, and a biconcave lens whose surface on the object side has strong curvature, in the order from the object side, and is arranged that an air lens with a shape like a positive meniscus lens is formed between said biconvex lens and said biconcave lens, which is located on the image side of said biconvex lens, so as to thereby cause aberrations of higher orders so that said air lens contiributes very much to correction of aberrations of the lens system as a whole over the whole vari-focal range.

The third lens group $G_3$ is arranged to at least comprise one positive lens and one cemented doublet, which consists of a biconvex lens and a negative lens which are cemented together.

Said lens groups up to the third lens group $G_3$, i.e., the first lens group $G_1$, second lens group $G_2$ and third lens group $G_3$, constitute a substantially afocal system while the fourth lens group $G_4$ and fifth lens group $G_5$ constitute a relay system.

The fourth lens group $G_4$ is arranged to at least comprise one positive lens and one cemented doublet, which consists of a biconvex lens and a negative meniscus lens. When it is arranged that the biconvex lens and negative meniscus lens constituting said cemented coublet in the fourth lens group $G_4$ are separated from each other so that an air lens with a shape like a positive meniscus lens is formed between said lenses as illustrated by preferred embodiments shown later, it is possible to correct aberrations of higher orders which are caused by the aforementioned air lens formed in the second lens group $G_2$ and which are not yet corrected satisfactorily by the lenses located in rear of said air lens in the second lens group $G_2$.

The fifth lens group $G_5$ has negative refractive power and may be composed of only one negative lens. However, to make astigmatism and distortion satisfactorily small and, at the same time, to correct spherical aberration and Petzval's sum, it is preferable to arrange that the fifth lens group $G_5$ comprises a positive lens and a negative lens as illustrated by preferred embodiments shown later.

When the fifth lens group $G_5$ is arranged to have negative refractive power and a magnification which fulfills the condition (3), it is possible to reduce the magnifications to be allotted respectively to the first lens group $G_1$ up to the fourth lens group $G_4$ which constitute a vari-focal system, and this is advantageous for correction of aberrations. Besides, the focal lengths of respective lens groups become short, the amounts of movements of respective lens groups at the time of zooming also become small, and it is possible to make the lens system small in size without difficulty. Moreover, it is possible to make the variation of aberrations small in spite of the fact that the vari-focal ratio about 6 is ensured.

In case of a zoom lens system with a high vari-focal ratio whose vari-focal range includes the range of a wide angle lens system up to the range of a telephoto lens system as in case of the zoom lens system according to the present invention, residual chromatic aberration causes decrease in the performance. Therefore, in the zoom lens system according to the present invention, a glass material with anomalous dispersion is used in the first lens group $G_1$ as illustrated by preferred embodiments shown later so as to thereby eliminate the secondary spectrum.

Besides, the tendency of lateral chromatic aberration itself is basically decided by the lens configuration of the zoom lens system. In the present invention, the second lens group $G_2$ is arranged to have such lens configuration that a biconvex lens is adequately used therein so as to thereby make it advantageous for correction of lateral chromatic aberration.

The third lens group $G_3$ is arranged that the front principal point thereof comes to a position largely put toward the object side so that, in combination with the fact that the rear principal point of the second lens group $G_2$ is arranged to come to a position largely put toward the object side, it is thereby made convenient for making the overall length of the lens system short.

Figure 2:
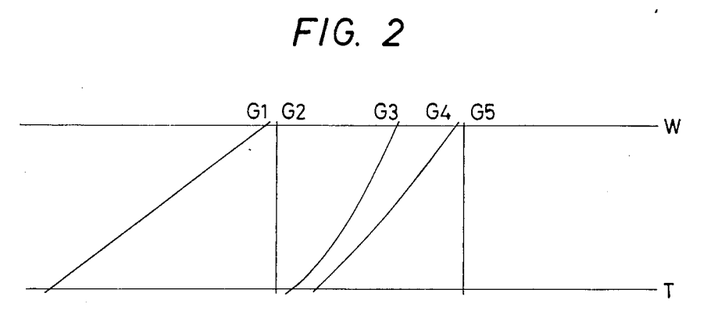
FIG. 2 shows the pattern of movements of lens groups constituting the zoom lens system according to the present invention at the time of zooming.
Figure 3:
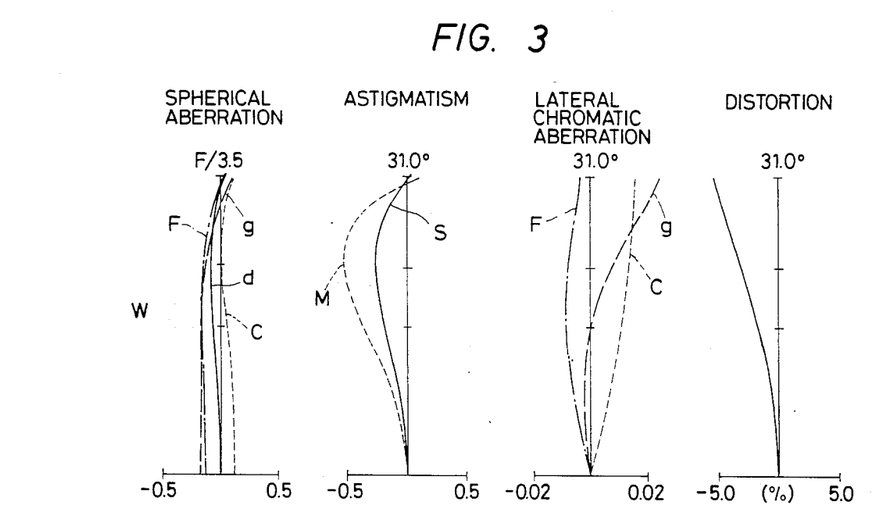
FIGS. 3 through 11 respectively show graphs illustrating aberration curves of respective embodiments of the zoom lens system according to the present invention.
Figure 4:
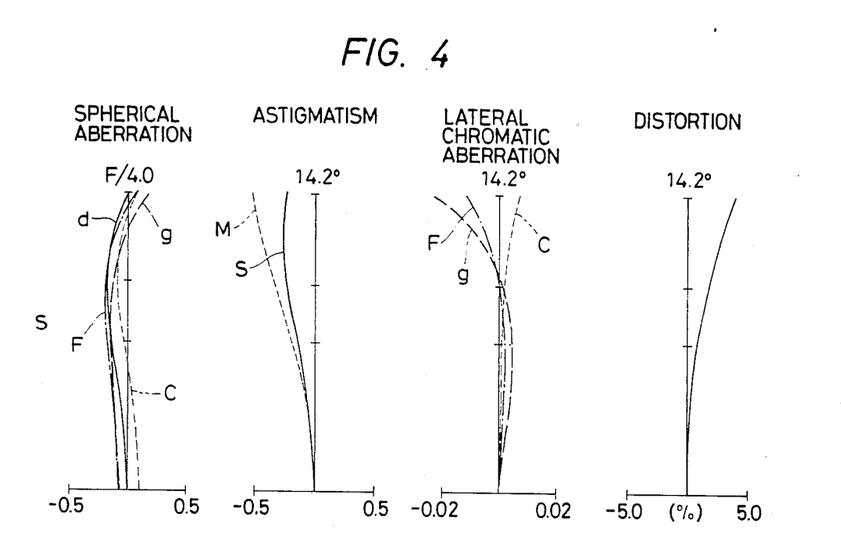
Figure 5:
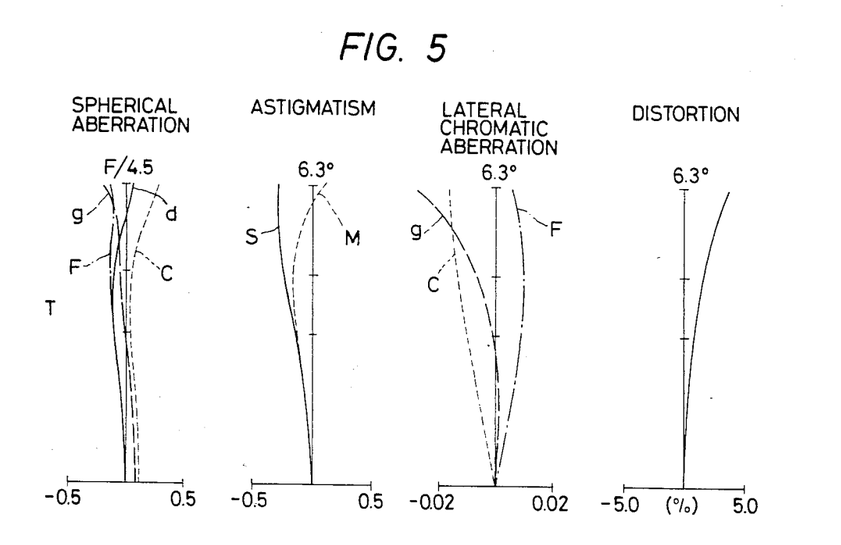
Figure 6:
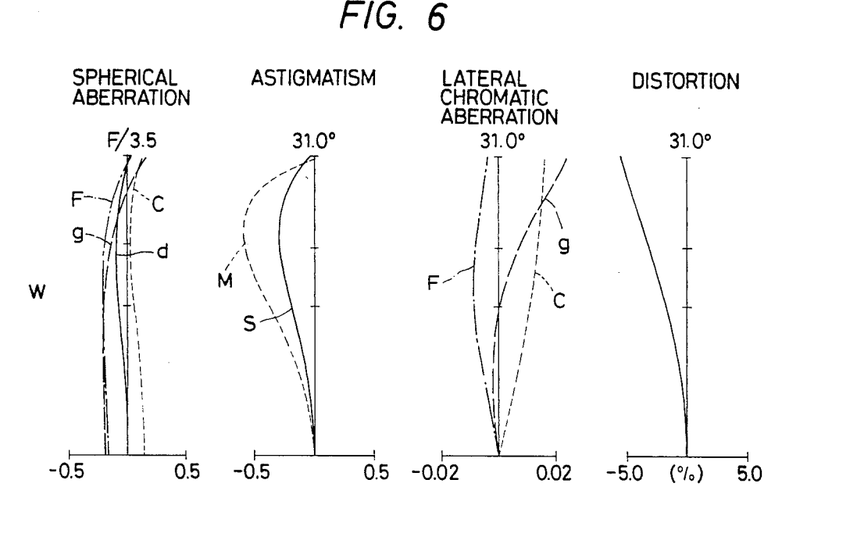
Figure 7:
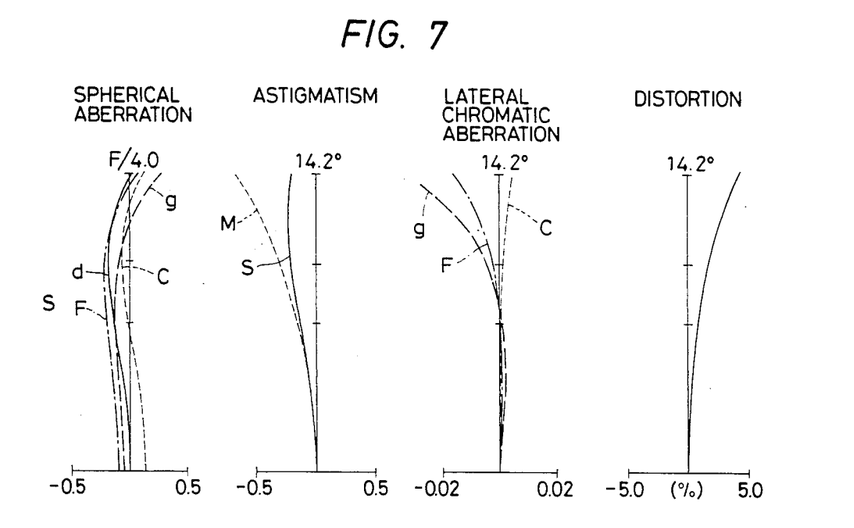
Figure 8:
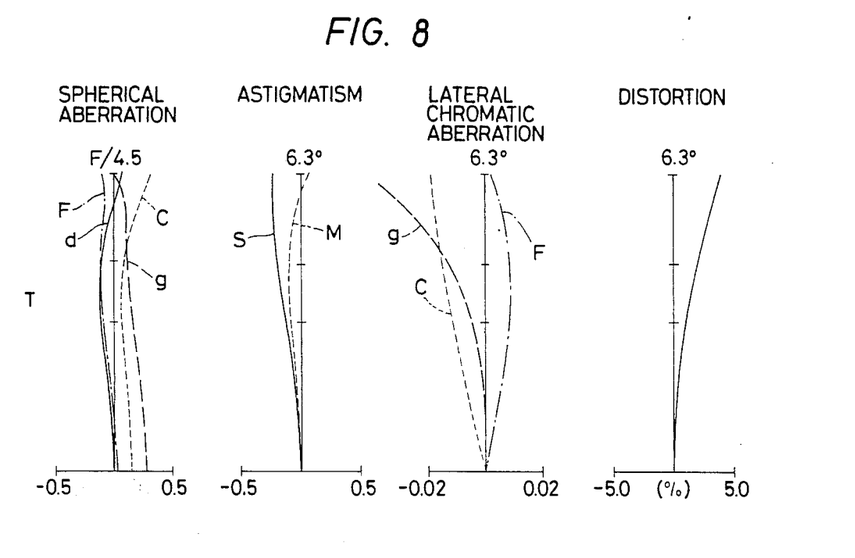
Figure 9:
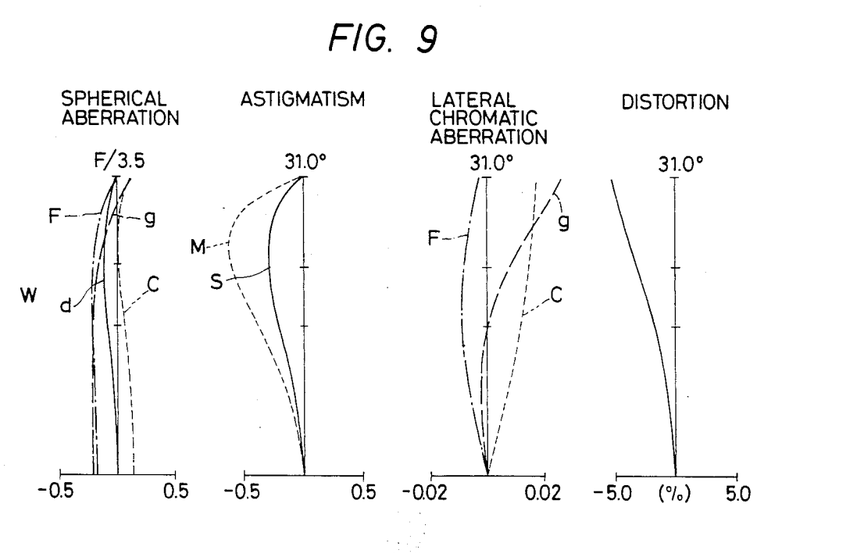
Figure 10:
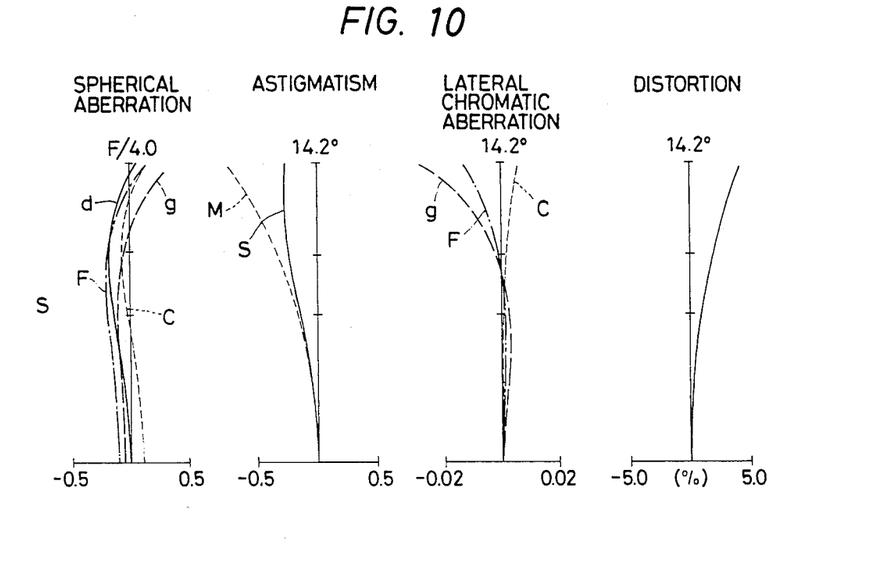
Figure 11:
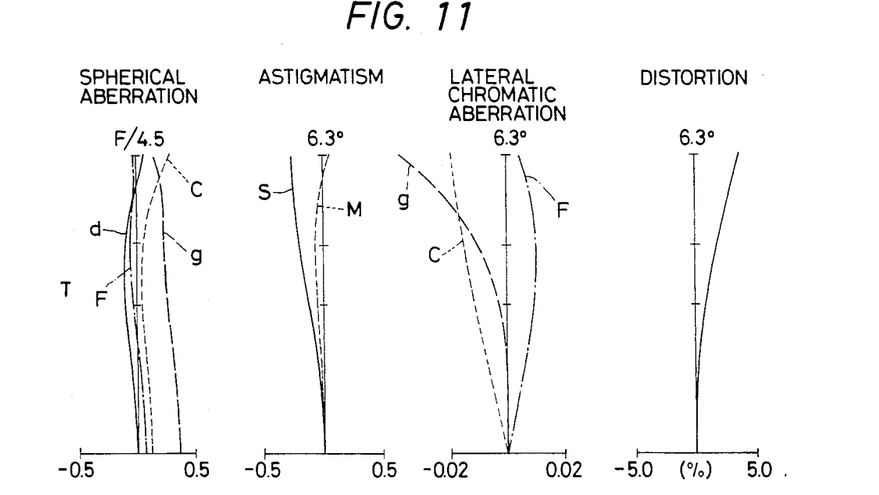

In case of the zoom lens system according to the present invention, when it is arranged that the first, third and fourth lens groups are moved as shown in FIG. 2 at the time of zooming as illustrated by preferred embodiments shown later, the number of movable lens groups becomes three in spite of the fact that the lens system comprises five lens groups, and it becomes easy to ensure the accuracy of the cam.

The zoom lens system according to the present invention is arranged that the variation of spherical aberration is made very small and the variation of astigmatism is made comparatively small. However, from the view point of the technology in the manufacture available at present, it is possible to make the flatness of the image surface more favourable when an aspherical surface or the like is adopted in the third lens group $G_3$ or fourth lens group $G_4$.

DETAILED DESCRIPTION OF THE PREFERRED EMBODIMENTS

Now, preferred embodiments of the zoom lens system according to the present invention described so far are shown below.

EMBODIMENT 1

| $f = 36 \sim 195.6$, F/3.5 $\sim$ F/4.5, $2\omega = 62° \sim 12.6°$ | | | |
|---|---|---|---|
| $r_1 = 265.393$ | | | |
| $d_1 = 2.29$ | $n_1 = 1.80518$ | $\nu_1 = 25.43$ |
| $r_2 = 78.3444$ | | | |
| $d_2 = 7.98$ | $n_2 = 1.497$ | $\nu_2 = 81.61$ |
| $r_3 = -179.2276$ | | | |
| $d_3 = 0.2$ | | | |
| $r_4 = 59.2582$ | | | |
| $d_4 = 4.86$ | $n_3 = 1.744$ | $\nu_3 = 44.73$ |
| $r_5 = 173.2891$ | | | |
| $d_5 = D_1$ | | | |
| $r_6 = 127.9258$ | | | |
| $d_6 = 1.42$ | $n_4 = 1.7865$ | $\nu_4 = 50.0$ |
| $r_7 = 19.068$ | | | |
| $d_7 = 5.0216$ | | | |
| $r_8 = -48.5847$ | | | |
| $d_8 = 1.39$ | $n_5 = 1.7865$ | $\nu_5 = 50.0$ |
| $r_9 = 88.3633$ | | | |
| $d_9 = 0.1905$ | | | |
| $r_{10} = 37.0317$ | | | |
| $d_{10} = 4.7$ | $n_6 = 1.84666$ | $\nu_6 = 23.78$ |
| $r_{11} = -64.4623$ | | | |
| $d_{11} = 1.55$ | | | |
| $r_{12} = -33.2011$ | | | |
| $d_{12} = 1.39$ | $n_7 = 1.7865$ | $\nu_7 = 50.0$ |
| $r_{13} = 804.1678$ | | | |
| $d_{13} = D_2$ | | | |
| $r_{14} = \infty$ (stop) | | | |
| $d_{14} = 0.9524$ | | | |
| $r_{15} = 86.0419$ | | | |
| $d_{15} = 3.4714$ | $n_8 = 1.617$ | $\nu_8 = 62.79$ |
| $r_{16} = -52.5565$ | | | |
| $d_{16} = 0.19$ | | | |
| $r_{17} = 74.5381$ | | | |
| $d_{17} = 6.0851$ | $n_9 = 1.51821$ | $\nu_9 = 65.04$ |
| $r_{18} = -34.8404$ | | | |
| $d_{18} = 1.2981$ | $n_{10} = 1.74$ | $\nu_{10} = 31.7$ |
| $r_{19} = -514.3567$ | | | |
| $d_{19} = 1.4146$ | | | |
| $r_{20} = 30.3372$ | | | |
| $d_{20} = 5.0864$ | $n_{11} = 1.52542$ | $\nu_{11} = 64.55$ |
| $r_{21} = 192.4854$ | | | |
| $d_{21} = 8.7098$ | | | |
| $r_{22} = -99.7097$ | | | |
| $d_{22} = 2.1182$ | $n_{12} = 1.8061$ | $\nu_{12} = 40.95$ |
| $r_{23} = 50.1429$ | | | |
| $d_{23} = D_3$ | | | |
| $r_{24} = 2745.5254$ | | | |
| $d_{24} = 3.75$ | $n_{13} = 1.51742$ | $\nu_{13} = 52.41$ |
| $r_{25} = -41.1151$ | | | |
| $d_{25} = 0.2$ | | | |
| $r_{26} = 70.8046$ | | | |
| $d_{26} = 7.1146$ | $n_{14} = 1.51742$ | $\nu_{14} = 52.41$ |
| $r_{27} = -28.5245$ | | | |
| $d_{27} = 1.2381$ | | | |
| $r_{28} = -25.1132$ | | | |
| $d_{28} = 1.46$ | $n_{15} = 1.834$ | $\nu_{15} = 37.16$ |
| $r_{29} = -76.0758$ | | | |
| $d_{29} = D_4$ | | | |
| $r_{30} = 1072.0189$ | | | |
| $d_{30} = 3.55$ | $n_{16} = 1.5927$ | $\nu_{16} = 35.29$ |
| $r_{31} = -75.3048$ | | | |
| $d_{31} = 0.135$ | | | |
| $r_{32} = -60.0519$ | | | |
| $d_{32} = 2.14$ | $n_{17} = 1.7725$ | $\nu_{17} = 49.66$ |
| $r_{33} = -249.2861$ | | | |
| f | 36 | 85.8 | 195.6 |
| $D_1$ | 1.854 | 31.234 | 49.461 |
| $D_2$ | 26.096 | 14.219 | 2.728 |
| $D_3$ | 13.526 | 7.92 | 5.817 |
| $D_4$ | 1.634 | 19.102 | 32.508 |

-continued

| $\|f_2/f_1\| = 0.1963, \|\beta_3w \cdot \beta_4w\| = 1.272$ |
|---|
| $\beta_5 = 1.058$ |

EMBODIMENT 2

$f = 36.03 \sim 196.06, F/3.5 \sim F/4.5, 2\omega = 62° \sim 12.6°$

| | | |
|---|---|---|
| $r_1 = 338.0421$ | | |
| $d_1 = 2.29$ | $n_1 = 1.80518$ | $\nu_1 = 25.43$ |
| $r_2 = 80.1411$ | | |
| $d_2 = 7.98$ | $n_2 = 1.603$ | $\nu_2 = 65.43$ |
| $r_3 = -206.9613$ | | |
| $d_3 = 0.2$ | | |
| $r_4 = 6.7301$ | | |
| $d_4 = 4.86$ | $n_3 = 1.72$ | $\nu_3 = 46.03$ |
| $r_5 = 161.6993$ | | |
| $d_5 = D_1$ | | |
| $r_6 = 139.3636$ | | |
| $d_6 = 1.42$ | $n_4 = 1.804$ | $\nu_4 = 46.57$ |
| $r_7 = 19.3118$ | | |
| $d_7 = 5.0216$ | | |
| $r_8 = -48.5652$ | | |
| $d_8 = 1.39$ | $n_5 = 1.788$ | $\nu_5 = 47.38$ |
| $r_9 = 104.6611$ | | |
| $d_9 = 0.1905$ | | |
| $r_{10} = 36.8874$ | | |
| $d_{10} = 4.7$ | $n_6 = 1.84666$ | $\nu_6 = 23.78$ |
| $r_{11} = -63.2261$ | | |
| $d_{11} = 1.7$ | | |
| $r_{12} = -33.1461$ | | |
| $d_{12} = 1.39$ | $n_7 = 1.7725$ | $\nu_7 = 49.66$ |
| $r_{13} = 742.7624$ | | |
| $d_{13} = D_2$ | | |
| $r_{14} = \infty$ (stop) | | |
| $d_{14} = 0.9524$ | | |
| $r_{15} = 68.2937$ | | |
| $d_{15} = 4.7662$ | $n_8 = 1.61272$ | $\nu_8 = 58.75$ |
| $r_{16} = -52.0579$ | | |
| $d_{16} = 0.19$ | | |
| $r_{17} = 69.9822$ | | |
| $d_{17} = 5.8049$ | $n_9 = 1.51742$ | $\nu_9 = 52.41$ |
| $r_{18} = -33.1947$ | | |
| $d_{18} = 1.2981$ | $n_{10} = 1.7552$ | $\nu_{10} = 27.51$ |
| $r_{19} = 13967.1813$ | | |
| $d_{19} = 1.4146$ | | |
| $r_{20} = 31.1511$ | | |
| $d_{20} = 4.9697$ | $n_{11} = 1.53172$ | $\nu_{11} = 48.9$ |
| $r_{21} = 163.1427$ | | |
| $d_{21} = 8.7098$ | | |
| $r_{22} = -96.9439$ | | |
| $d_{22} = 1.6674$ | $n_{12} = 1.79952$ | $\nu_{12} = 42.24$ |
| $r_{23} = 47.796$ | | |
| $d_{23} = D_3$ | | |
| $r_{24} = 22894.428$ | | |
| $d_{24} = 3.75$ | $n_{13} = 1.51454$ | $\nu_{13} = 54.69$ |
| $r_{25} = -41.8145$ | | |
| $d_{25} = 0.2$ | | |
| $r_{26} = 71.2165$ | | |
| $d_{26} = 7.2557$ | $n_{14} = 1.51742$ | $\nu_{14} = 52.41$ |
| $r_{27} = -27.6015$ | | |
| $d_{27} = 1.2368$ | | |
| $r_{28} = -24.8181$ | | |
| $d_{28} = 1.46$ | $n_{15} = 1.834$ | $\nu_{15} = 37.16$ |
| $r_{29} = -71.2266$ | | |
| $d_{29} = D_4$ | | |
| $r_{30} = 220.962$ | | |
| $d_{30} = 3.55$ | $n_{16} = 1.5927$ | $\nu_{16} = 35.29$ |
| $r_{31} = -93.2497$ | | |
| $d_{31} = 0.135$ | | |
| $r_{32} = -81.3107$ | | |
| $d_{32} = 2.14$ | $n_{17} = 1.7859$ | $\nu_{17} = 44.18$ |
| $r_{33} = 1098.844$ | | |

| f | 36.03 | 85.8 | 196.06 |
|---|---|---|---|
| $D_1$ | 1.838 | 31.599 | 50.29 |
| $D_2$ | 27.533 | 14.994 | 2.734 |
| $D_3$ | 13.49 | 8.546 | 6.866 |
| $D_4$ | 1.621 | 19.073 | 32.063 |

$\|f_2/f_1\| = 0.2, \|\beta_3w \cdot \beta_4w\| = 1.236$

-continued

| $\beta_5 = 1.048$ |
|---|

EMBODIMENT 3

$f = 36.03 \sim 196.04, F/3.5 \sim F/4.5, 2\omega = 62° \sim 12.6°$

| | | |
|---|---|---|
| $r_1 = 352.2511$ | | |
| $d_1 = 2.29$ | $n_1 = 1.80518$ | $\nu_1 = 25.43$ |
| $r_2 = 78.5728$ | | |
| $d_2 = 7.98$ | $n_2 = 1.618$ | $\nu_2 = 63.38$ |
| $r_3 = -221.4068$ | | |
| $d_3 = 0.2$ | | |
| $r_4 = 61.6679$ | | |
| $d_4 = 4.86$ | $n_3 = 1.72$ | $\nu_3 = 46.03$ |
| $r_5 = 165.8793$ | | |
| $d_5 = D_1$ | | |
| $r_6 = 131.4563$ | | |
| $d_6 = 1.42$ | $n_4 = 1.804$ | $\nu_4 = 46.57$ |
| $r_7 = 19.3079$ | | |
| $d_7 = 5.0216$ | | |
| $r_8 = -48.9816$ | | |
| $d_8 = 1.39$ | $n_5 = 1.788$ | $\nu_5 = 47.38$ |
| $r_9 = 97.3482$ | | |
| $d_9 = 0.1905$ | | |
| $r_{10} = 36.9123$ | | |
| $d_{10} = 4.7$ | $n_6 = 1.84666$ | $\nu_6 = 23.78$ |
| $r_{11} = 63.4051$ | | |
| $d_{11} = 1.7$ | | |
| $r_{12} = -33.2626$ | | |
| $d_{12} = 1.39$ | $n_7 = 1.7725$ | $\nu_7 = 49.66$ |
| $r_{13} = 933.4244$ | | |
| $d_{13} = D_2$ | | |
| $r_{14} = \infty$ (stop) | | |
| $d_{14} = 0.9524$ | | |
| $r_{15} = 65.4971$ | | |
| $d_{15} = 4.98$ | $n_8 = 1.60729$ | $\nu_8 = 59.38$ |
| $r_{16} = -52.3558$ | | |
| $d_{16} = 0.19$ | | |
| $r_{17} = 67.4426$ | | |
| $d_{17} = 5.8$ | $n_9 = 1.51742$ | $\nu_9 = 52.41$ |
| $r_{18} = -33.7413$ | | |
| $d_{18} = 1.4$ | $n_{10} = 1.7552$ | $\nu_{10} = 27.51$ |
| $r_{19} = -2224.3729$ | | |
| $d_{19} = 1.4146$ | | |
| $r_{20} = 31.5731$ | | |
| $d_{20} = 4.95$ | $n_{11} = 1.53172$ | $\nu_{11} = 48.9$ |
| $r_{21} = 148.5652$ | | |
| $d_{21} = 8.7098$ | | |
| $r_{22} = -94.8911$ | | |
| $d_{22} = 1.57$ | $n_{12} = 1.8061$ | $\nu_{12} = 40.95$ |
| $r_{23} = 46.4585$ | | |
| $d_{23} = D_3$ | | |
| $r_{24} = -1836.2174$ | | |
| $d_{24} = 3.75$ | $n_{13} = 1.51454$ | $\nu_{13} = 54.69$ |
| $r_{25} = -42.0029$ | | |
| $d_{25} = 0.2$ | | |
| $r_{26} = 78.329$ | | |
| $d_{26} = 7.3$ | $n_{14} = 1.51742$ | $\nu_{14} = 52.41$ |
| $r_{27} = -27.3994$ | | |
| $d_{27} = 1.2365$ | | |
| $r_{28} = -24.7529$ | | |
| $d_{28} = 1.46$ | $n_{15} = 1.834$ | $\nu_{15} = 37.16$ |
| $r_{29} = -65.7735$ | | |
| $d_{29} = D_4$ | | |
| $r_{30} = 313.3376$ | | |
| $d_{30} = 3.6$ | $n_{16} = 1.5927$ | $\nu_{16} = 35.29$ |
| $r_{31} = -97.1419$ | | |
| $d_{31} = 0.135$ | | |
| $r_{32} = -80.2502$ | | |
| $d_{32} = 2.45$ | $n_{17} = 1.7859$ | $\nu_{17} = 44.18$ |
| $r_{33} = -625.9883$ | | |

| f | 36.03 | 85.83 | 196.04 |
|---|---|---|---|
| $D_1$ | 1.867 | 31.345 | 49.843 |
| $D_2$ | 27.372 | 14.948 | 2.741 |
| $D_3$ | 13.504 | 8.013 | 6.066 |
| $D_4$ | 1.622 | 19.595 | 33.04 |

$\|f_2/f_1\| = 0.2006, \|\beta_3w \cdot \beta_4w\| = 1.264$

-continued $$\beta_5 = 1.019$$

In respective embodiments shown in the above, reference symbols $r_1$ through $r_{33}$ respectively represent radii of curvature of respective lens surfaces, reference symbols $d_1$ through $d_{32}$ respectively represent thicknesses of respective lenses and airspaces between respective lenses, reference symbols $n_1$ through $n_{17}$ respectively represent refractive indices of respective lenses, and reference symbols $\nu_1$ through $\nu_{17}$ respectively represent Abbe's numbers of respective lenses.

Each of preferred embodiments shown in the above has the lens configuration as shown in FIG. 1. That is, the first lens group $G_1$ comprises a cemented doublet, which consists of a negative meniscus lens and a biconvex lens, and a positive meniscus lens, the second lens group $G_2$ comprises a negative meniscus lens, a biconcave lens, a biconvex lens, and a biconcave lens, the third lens group $G_3$ comprises a positive lens, a cemented doublet which consists of a biconvex lens and a negative lens, a positive lens, and a negative lens, the fourth lens group $G_4$ comprises a positive lens, a positive lens, and a negative lens, the latter of said positive lenses and said negative lens being slightly spaced from each other so that an air lens with a shape like a positive meniscus lens is formed therebetween, and the fifth lens group $G_5$ comprises a positive lens, and a negative lens.

In FIG. 1, reference symbols W, S and T respectively represent the states of the zoom lens system in the wide position, standard position and teleposition.

Graphs illustrating aberration curves of said embodiments are shown in FIGS. 3 through 11 respectively. Out of them, FIGS. 3, 4 and 5 respectively show aberration curves of Embodiment 1 in the wide position, standard position and teleposition, FIGS. 6, 7 and 8 respectively show aberration curves of Embodiment 2 in the wide position, standard position and teleposition, and FIGS. 9, 10 and 11 respectively show aberration curves of Embodiment 3 in the wide position, standard position and teleposition.

I claim:

1. A zoom lens system comprising a first lens group having positive refractive power, a second lens group having negative refractive power, a third lens group having positive refractive power, a fourth lens group having positive refractive power, and a fifth lens group having negative refractive power, in the order from the object side, and arranged to vary the focal length of the lens system as a whole by at least moving said first, third and fourth lens groups in the direction of the optical axis, said zoom lens system being arranged to fulfill the following conditions:

$$0.15 < |f_2/f_1| < 0.3 \quad (1)$$

$$0.5 < |\beta_{3w} \cdot \beta_{4w}| < 2.5 \quad (2)$$

$$1.01 < \beta_5 < 1.3 \quad (3)$$

where, reference symbol $f_1$ represents the focal length of the first lens group, reference symbol $f_2$ represents the focal length of the second lens group, reference symbol $\beta_{3w}$ represents the lateral magnification of the third lens group in the wide position, reference symbol $\beta_{4w}$ represents the lateral magnification of the fourth lens group in the wide position, and reference symbol $\beta_5$ represents the lateral magnification of the fifth lens group.

2. A zoom lens system according to claim 1 wherein said first lens group comprises a cemented doublet consisting of a negative meniscus lens and a biconvex lens cemented together, and a positive meniscus lens arranged on the image side of said cemented doublet.

3. A zoom lens system according to claim 1 wherein said second lens group comprises a negative meniscus lens convex toward the object side, a biconcave lens, a biconvex lens, and a biconcave lens whose surface on the object side has strong curvature, in the order from the object side, and arranged that an air lens with a shape like a positive meniscus lens is formed between said biconvex lens and said biconcave lens arranged on the image side of said biconvex lens.

4. A zoom lens system according to claim 1 wherein said third lens group is arranged to at least comprise one positive lens, and one cemented doublet consisting of a biconvex lens and a negative lens cemented together.

5. A zoom lens system according to claim 1 wherein said fourth lens group is arranged to at least comprise one positive lens, and one doublet.

6. A zoom lens system according to claim 1 wherein said fifth lens group comprises a positive lens, and a negative lens.

7. A zoom lens system according to claim 1 wherein said first lens group comprises a cemented doublet, which consists of a negative meniscus lens and a biconvex lens, and a positive meniscus lens, said second lens group comprises a negative meniscus lens, a biconcave lens, a biconvex lens, and a biconcave lens, said third lens group comprises a positive lens, a cemented doublet which consists of a biconvex lens and a negative lens, a positive lens, and a negative lens, said fourth lens group comprises a positive lens, a positive lens, and a negative lens, and said fifth lens group comprises a positive lens, and a negative lens, said zoom lens system having the following numerical data:

| $f = 36 \sim 195.6$, F/3.5$\sim$F/4.5, $2\omega = 62° \sim 12.6°$ | | | |
|---|---|---|---|
| $r_1 = 265.393$ | | | |
| $d_1 = 2.29$ | $n_1 = 1.80518$ | $\nu_1 = 25.43$ | |
| $r_2 = 78.3444$ | | | |
| $d_2 = 7.98$ | $n_2 = 1.497$ | $\nu_2 = 81.61$ | |
| $r_3 = -179.2276$ | | | |
| $d_3 = 0.2$ | | | |
| $r_4 = 59.2582$ | | | |
| $d_4 = 4.86$ | $n_3 = 1.744$ | $\nu_3 = 44.73$ | |
| $r_5 = 173.2891$ | | | |
| $d_5 = D_1$ | | | |
| $r_6 = 127.9258$ | | | |
| $d_6 = 1.42$ | $n_4 = 1.7865$ | $\nu_4 = 50.0$ | |
| $r_7 = 19.068$ | | | |
| $d_7 = 5.0216$ | | | |
| $r_8 = -48.5847$ | | | |
| $d_8 = 1.39$ | $n_5 = 1.7865$ | $\nu_5 = 50.0$ | |
| $r_9 = 88.3633$ | | | |
| $d_9 = 0.1905$ | | | |
| $r_{10} = 37.0317$ | | | |
| $d_{10} = 4.7$ | $n_6 = 1.84666$ | $\nu_6 = 23.78$ | |
| $r_{11} = -64.4623$ | | | |
| $d_{11} = 1.55$ | | | |
| $r_{12} = -33.2011$ | | | |
| $d_{12} = 1.39$ | $n_7 = 1.7865$ | $\nu_7 = 50.0$ | |
| $r_{13} = 804.1678$ | | | |
| $d_{13} = D_2$ | | | |
| $r_{14} = \infty$ (stop) | | | |
| $d_{14} = 0.9524$ | | | |
| $r_{15} = 86.0419$ | | | |
| $d_{15} = 3.4714$ | $n_8 = 1.617$ | $\nu_8 = 62.79$ | |
| $r_{16} = -52.5565$ | | | |
| $d_{16} = 0.19$ | | | |

-continued

| | | |
|---|---|---|
| $r_{17} = 74.5381$ | | |
| $d_{17} = 6.0851$ | $n_9 = 1.51821$ | $v_9 = 65.04$ |
| $r_{18} = -34.8404$ | | |
| $d_{18} = 1.2981$ | $n_{10} = 1.74$ | $v_{10} = 31.7$ |
| $r_{19} = -514.3567$ | | |
| $d_{19} = 1.4146$ | | |
| $r_{20} = 30.3372$ | | |
| $d_{20} = 5.0864$ | $n_{11} = 1.52542$ | $v_{11} = 64.55$ |
| $r_{21} = 192.4854$ | | |
| $d_{21} = 8.7098$ | | |
| $r_{22} = -99.7097$ | | |
| $d_{22} = 2.1182$ | $n_{12} = 1.8061$ | $v_{12} = 40.95$ |
| $r_{23} = 50.1429$ | | |
| $d_{23} = D_3$ | | |
| $r_{24} = 2745.5254$ | | |
| $d_{24} = 3.75$ | $n_{13} = 1.51742$ | $v_{13} = 52.41$ |
| $r_{25} = -41.1151$ | | |
| $d_{25} = 0.2$ | | |
| $r_{26} = 70.8046$ | | |
| $d_{26} = 7.1146$ | $n_{14} = 1.51742$ | $v_{14} = 52.41$ |
| $r_{27} = -28.5245$ | | |
| $d_{27} = 1.2381$ | | |
| $r_{28} = -25.1132$ | | |
| $d_{28} = 1.46$ | $n_{15} = 1.834$ | $v_{15} = 37.16$ |
| $r_{29} = -76.0758$ | | |
| $d_{29} = D_4$ | | |
| $r_{30} = 1072.0189$ | | |
| $d_{30} = 3.55$ | $n_{16} = 1.5927$ | $v_{16} = 35.29$ |
| $r_{31} = -75.3048$ | | |
| $d_{31} = 0.135$ | | |
| $r_{32} = -60.0519$ | | |
| $d_{32} = 2.14$ | $n_{17} = 1.7725$ | $v_{17} = 49.66$ |
| $r_{33} = -249.2861$ | | |

| f | 36 | 85.8 | 195.6 |
|---|---|---|---|
| $D_1$ | 1.854 | 31.234 | 49.461 |
| $D_2$ | 26.096 | 14.219 | 2.728 |
| $D_3$ | 13.526 | 7.92 | 5.817 |
| $D_4$ | 1.634 | 19.102 | 32.508 |

$|f_2/f_1| = 0.1963$, $|\beta_{3w} \cdot \beta_{4w}| = 1.272$
$\beta_5 = 1.058$ where, reference symbols $r_1$ through $r_{33}$ respectively represent radii of curvature of respective lens surfaces, reference symbols $d_1$ through $d_{32}$ respectively represent thicknesses of respective lenses and airspaces between respective lenses, reference symbols $n_1$ through $n_{17}$ respectively represent refractive indices of respective lenses, and reference symbols $v_1$ through $v_{17}$ respectively represent Abbe's numbers of respective lenses.

8. A zoom lens system according to claim 1 wherein said first lens group comprises a cemented doublet, which consists of a negative meniscus lens and a biconvex lens, and a positive meniscus lens, said second lens group comprises a negative meniscus lens, a biconcave lens, a biconvex lens, and a biconcave lens, said third lens group comprises a positive lens, a cemented doublet which consists of a biconvex lens and a negative lens, a positive lens, and a negative lens, said fourth lens group comprises a positive lens, a positve lens, and a negative lens, and said fifth lens group comprises a positive lens, and a negative lens, said zoom lens system having the following numerical data:

$f = 36.03 \sim 196.06$, $F/3.5 \sim F/4.5$, $2\omega = 62° \sim 12.6°$

| | | |
|---|---|---|
| $r_1 = 338.0421$ | | |
| $d_1 = 2.29$ | $n_1 = 1.80518$ | $v_1 = 25.43$ |
| $r_2 = 80.1411$ | | |
| $d_2 = 7.98$ | $n_2 = 1.603$ | $v_2 = 65.43$ |
| $r_3 = -206.9613$ | | |
| $d_3 = 0.2$ | | |
| $r_4 = 61.7301$ | | |
| $d_4 = 4.86$ | $n_3 = 1.72$ | $v_3 = 46.03$ |
| $r_5 = 161.6993$ | | |

-continued

| | | |
|---|---|---|
| $d_5 = D_1$ | | |
| $r_6 = 139.3636$ | | |
| $d_6 = 1.42$ | $n_4 = 1.84$ | $v_4 = 46.57$ |
| $r_7 = 19.3118$ | | |
| $d_7 = 5.0216$ | | |
| $r_8 = -48.5652$ | | |
| $d_8 = 1.39$ | $n_5 = 1.788$ | $v_5 = 47.38$ |
| $r_9 = 104.6611$ | | |
| $d_9 = 0.1905$ | | |
| $r_{10} = 36.8874$ | | |
| $d_{10} = 4.7$ | $n_6 = 1.84666$ | $v_6 = 23.78$ |
| $r_{11} = -63.2261$ | | |
| $d_{11} = 1.7$ | | |
| $r_{12} = -33.1461$ | | |
| $d_{12} = 1.39$ | $n_7 = 1.7725$ | $v_7 = 49.66$ |
| $r_{13} = 742.7624$ | | |
| $d_{13} = D_2$ | | |
| $r_{14} = \infty$ (stop) | | |
| $d_{14} = 0.9524$ | | |
| $r_{15} = 68.2937$ | | |
| $d_{15} = 4.7662$ | $n_8 = 1.61272$ | $v_8 = 58.75$ |
| $r_{16} = -52.0579$ | | |
| $d_{16} = 0.19$ | | |
| $r_{17} = 69.9822$ | | |
| $d_{17} = 5.8049$ | $n_9 = 1.51742$ | $v_9 = 52.41$ |
| $r_{18} = -33.1947$ | | |
| $d_{18} = 1.2981$ | $n_{10} = 1.7552$ | $v_{10} = 27.51$ |
| $r_{19} = 13967.1813$ | | |
| $d_{19} = 1.4146$ | | |
| $r_{20} = 31.1511$ | | |
| $d_{20} = 4.9697$ | $n_{11} = 1.53172$ | $v_{11} = 48.9$ |
| $r_{21} = 163.1427$ | | |
| $d_{21} = 8.7098$ | | |
| $r_{22} = -96.9439$ | | |
| $d_{22} = 1.6674$ | $n_{12} = 1.79952$ | $v_{12} = 42.24$ |
| $r_{23} = 47.796$ | | |
| $d_{23} = D_3$ | | |
| $r_{24} = 22894.428$ | | |
| $d_{24} = 3.75$ | $n_{13} = 1.51454$ | $v_{13} = 54.69$ |
| $r_{25} = -41.8145$ | | |
| $d_{25} = 0.2$ | | |
| $r_{26} = 71.2165$ | | |
| $d_{26} = 7.2557$ | $n_{14} = 1.51742$ | $v_{14} = 52.41$ |
| $r_{27} = -27.6015$ | | |
| $d_{27} = 1.2368$ | | |
| $r_{28} = -24.8181$ | | |
| $d_{28} = 1.46$ | $n_{15} = 1.834$ | $v_{15} = 37.16$ |
| $r_{29} = -71.2266$ | | |
| $d_{29} = D_4$ | | |
| $r_{30} = 220.962$ | | |
| $d_{30} = 3.55$ | $n_{16} = 1.5927$ | $v_{16} = 35.29$ |
| $r_{31} = -93.2497$ | | |
| $d_{31} = 0.135$ | | |
| $r_{32} = -81.3107$ | | |
| $d_{32} = 2.14$ | $n_{17} = 1.7859$ | $v_{17} = 44.18$ |
| $r_{33} = 1098.844$ | | |

| f | 36.03 | 85.8 | 196.06 |
|---|---|---|---|
| $D_1$ | 1.838 | 31.599 | 50.29 |
| $D_2$ | 27.533 | 14.994 | 2.734 |
| $D_3$ | 13.49 | 8.546 | 6.866 |
| $D_4$ | 1.621 | 19.073 | 32.063 |

$|f_2/f_1| = 0.2$, $|\beta_{3w} \cdot \beta_{4w}| = 1.236$
$\beta_5 = 1.048$ where, reference symbols $r_1$ through $r_{33}$ respectively represent radii of curvature of respective lens surfaces, reference symbols $d_1$ through $d_{32}$ respectively represent thicknesses of respective lenses and airspaces between respective lenses, reference symbols $n_1$ through $n_{17}$ respectively represent refractive indices of respective lenses, and reference symbols $v_1$ through $v_{17}$ respectively represent Abbe's numbers of respective lenses.

9. A zoom lens system according to claim 1 wherein said first lens group comprises a cemented doublet, which consists of a negative meniscus lens and a biconvex lens, and a positive meniscus lens, said second lens group comprises a negative meniscus lens, a biconcave lens, a biconvex lens, and a biconcave lens, said third lens group comprises a positive lens, a cemented doublet which consists of a biconvex lens and a negative lens, a positive lens, and a negative lens, said fourth lens group comprises a positive lens, a positive lens, and a negative lens, and said fifth lens group comprises a positive lens, and a negative lens, said zoom lens system having the following numerical data:

| $f = 36.03 \sim 196.04$, F/3.5~F/4.5, $2\omega = 62° \sim 12.6°$ | | | |
|---|---|---|---|
| $r_1 = 352.2511$ | | | |
| $d_1 = 2.29$ | $n_1 = 1.80518$ | $\nu_1 = 25.43$ | |
| $r_2 = 78.5728$ | | | |
| $d_2 = 7.98$ | $n_2 = 1.618$ | $\nu_2 = 63.38$ | |
| $r_3 = -221.4068$ | | | |
| $d_3 = 0.2$ | | | |
| $r_4 = 61.6679$ | | | |
| $d_4 = 4.86$ | $n_3 = 1.72$ | $\nu_3 = 46.03$ | |
| $r_5 = 165.8793$ | | | |
| $d_5 = D_1$ | | | |
| $r_6 = 131.4563$ | | | |
| $d_6 = 1.42$ | $n_4 = 1.804$ | $\nu_4 = 46.57$ | |
| $r_7 = 19.3079$ | | | |
| $d_7 = 5.0216$ | | | |
| $r_8 = -48.9816$ | | | |
| $d_8 = 1.39$ | $n_5 = 1.788$ | $\nu_5 = 47.38$ | |
| $r_9 = 97.3482$ | | | |
| $d_9 = 0.1905$ | | | |
| $r_{10} = 36.9123$ | | | |
| $d_{10} = 4.7$ | $n_6 = 1.84666$ | $\nu_6 = 23.78$ | |
| $r_{11} = 63.4051$ | | | |
| $d_{11} = 1.7$ | | | |
| $r_{12} = -33.2626$ | | | |
| $d_{12} = 1.39$ | $n_7 = 1.7725$ | $\nu_7 = 49.66$ | |
| $r_{13} = 933.4244$ | | | |
| $d_{13} = D_2$ | | | |
| $r_{14} = \infty$ (stop) | | | |
| $d_{14} = 0.9524$ | | | |
| $r_{15} = 65.4971$ | | | |
| $d_{15} = 4.98$ | $n_8 = 1.60729$ | $\nu_8 = 59.38$ | |
| $r_{16} = -52.3558$ | | | |
| $d_{16} = 0.19$ | | | |
| $r_{17} = 67.4426$ | | | |
| $d_{17} = 5.8$ | $n_9 = 1.51742$ | $\nu_9 = 52.41$ | |
| $r_{18} = -33.7413$ | | | |
| $d_{18} = 1.4$ | $n_{10} = 1.7552$ | $\nu_{10} = 27.51$ | |
| $r_{19} = -2224.3729$ | | | |
| $d_{19} = 1.4146$ | | | |
| $r_{20} = 31.5731$ | | | |
| $d_{20} = 4.95$ | $n_{11} = 1.53172$ | $\nu_{11} = 48.9$ | |
| $r_{21} = 148.5652$ | | | |
| $d_{21} = 8.7098$ | | | |
| $r_{22} = -94.8911$ | | | |
| $d_{22} = 1.57$ | $n_{12} = 1.8061$ | $\nu_{12} = 40.95$ | |
| $r_{23} = 46.4585$ | | | |
| $d_{23} = D_3$ | | | |
| $r_{24} = -1836.2174$ | | | |
| $d_{24} = 3.75$ | $n_{13} = 1.51454$ | $\nu_{13} = 54.69$ | |
| $r_{25} = -42.0029$ | | | |
| $d_{25} = 0.2$ | | | |
| $r_{26} = 78.329$ | | | |
| $d_{26} = 7.3$ | $n_{14} = 1.51742$ | $\nu_{14} = 52.41$ | |
| $r_{27} = -27.3994$ | | | |
| $d_{27} = 1.2365$ | | | |
| $r_{28} = -24.7549$ | | | |
| $d_{28} = 1.46$ | $n_{15} = 1.834$ | $\nu_{15} = 37.16$ | |
| $r_{29} = -65.7735$ | | | |
| $d_{29} = D_4$ | | | |
| $r_{30} = 313.3376$ | | | |
| $d_{30} = 3.6$ | $n_{16} = 1.5927$ | $\nu_{16} = 35.29$ | |
| $r_{31} = -97.1419$ | | | |
| $d_{31} = 0.135$ | | | |
| $r_{32} = -80.2502$ | | | |
| $d_{32} = 2.45$ | $n_{17} = 1.7859$ | $\nu_{17} = 44.18$ | |
| $r_{33} = -625.9883$ | | | |

| f | 36.03 | 85.83 | 196.04 |
|---|---|---|---|
| $D_1$ | 1.867 | 31.345 | 49.843 |
| $D_2$ | 27.372 | 14.948 | 2.741 |
| $D_3$ | 13.504 | 8.013 | 6.066 |
| $D_4$ | 1.622 | 19.595 | 33.4 |

$|f_2/f_1| = 0.2006$, $|\beta_{3w} \cdot \beta_{4w}| = 1.264$
$\beta_5 = 1.019$ where, reference symbols $r_1$ through $r_{33}$ respectively represent radii of curvature of respective lens surfaces, reference symbols $d_1$ through $d_{32}$ respectively represent thicknesses of respective lenses and airspaces between respective lenses, reference symbols $n_1$ through $n_{17}$ respectively represent refractive indices of respective lenses, and reference symbols $\nu_1$ through $\nu_{17}$ respectively represent Abbe's numbers of respective lenses.

* * * * *